P. D. HARVEY.
AUTOMATIC WAGON BRAKE.
APPLICATION FILED JUNE 3, 1914.

1,243,935.

Patented Oct. 23, 1917.
2 SHEETS—SHEET 1.

Witnesses

Inventor
P. D. Harvey.

By

Attorney

P. D. HARVEY.
AUTOMATIC WAGON BRAKE.
APPLICATION FILED JUNE 3, 1914.

1,243,935.

Patented Oct. 23, 1917.
2 SHEETS—SHEET 2.

Witnesses
R. N. Jones.

Inventor
P. D. Harvey.

UNITED STATES PATENT OFFICE.

PHILIP DOCTOR HARVEY, OF STRATTON, COLORADO.

AUTOMATIC WAGON-BRAKE.

1,243,935.  Specification of Letters Patent.  Patented Oct. 23, 1917.

Application filed June 3, 1914. Serial No. 842,808.

*To all whom it may concern:*

Be it known that I, PHILIP DOCTOR HARVEY, a citizen of the United States, residing at Stratton, in the county of Kit Carson and State of Colorado, have invented certain new and useful Improvements in Automatic Wagon-Brakes, of which the following is a specification.

This invention relates to new and useful improvements in automatic wagon brakes and has for its principal object to provide a simple and effective brake which will automatically operate with the shifting of the load.

Another object of the invention is to provide a simple and effective bolster which will hold the wagon body in place and still permit the same to shift longitudinally.

A further object of the invention is to provide a bolster carrying rollers upon which the body rests to permit said body to slide.

With these and other objects in view the invention consists of the novel combination and arrangement of parts which will be fully set forth in the following specification and accompanying drawings, in which.

Figure 1:
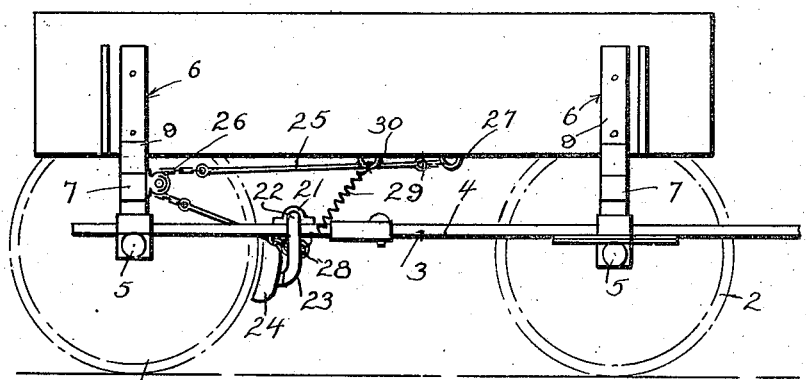
Figure 1 is a side view in elevation of a wagon constructed in accordance with this invention.

Referring now to the drawings by character of reference the numeral 1 designates the rear wheels of a wagon while the numeral 2 designates the front wheels thereof. These wheels are connected by the usual running gear designated generally by the numeral 3 which comprises a reach rod 4 to which the axles 5 are secured. This reach rod is preferably of the ordinary construction and is arranged to be accessible to permit wagon bodies of different sizes to be used.

Secured to the axle are the usual bolsters designated generally by the numerals 6 which comprise the ordinary transversely extending supporting element 7 having an upper edge 8 at each end. The ordinary reinforcing strips 9 are secured to the bolsters and are arranged to prevent the uprights 8 from becoming displaced. Secured to the transverse bars 7 of the bolsters 6 is a suitable casting 10 having formed therein the longitudinal groove 11. This plate or casting 10 is also provided with the depressions 12 in the upper surface, as will be clearly seen upon referring to Fig. 3. A suitable aperture 13 is formed in each end of the plates or castings 10 and is arranged to form a journal bearing for the trunnion 14 of the vertical roller 15 which extends parallel to the upright 8, hereinbefore described. The opposite end of the roller 15 is provided with a suitable trunnion 16 which is journaled in an aperture which is formed in the extension 17 of the strip 9, hereinbefore referred to. Extending vertically through the transverse supporting members 7 are the eye bolts 18 in which the trunnions 19 of the horizontal roller 20 are journaled. Secured to the reach rod 4 is a suitable journal bearing 21 in which the rod 22 to which the arms 23 carrying the brake shoes 24 are secured is journaled. A connection 25, connected to the body at 27 and to the rod 22 intermediate its ends, includes a chain section which passes over a pulley 26 secured to the wagon gear. Thus it will be seen that when the wagon body shifts forward in the position illustrated in Fig. 2 the connection will again pull on the arm and cause the brakes to be applied.

In order to release the brake mechanism after it has once been operated there is provided on each of the arms 23 a suitable eye 28 to which one end of the coil spring 29 is secured. The opposite end of the coil spring 29 is secured to the wagon body, as at 30, and it will be apparent that when the brake is applied the spring will be extended and will exert a pull on the lever and thereby as soon as the wagon again rights itself the brake will be caused to be released.

Figure 2:
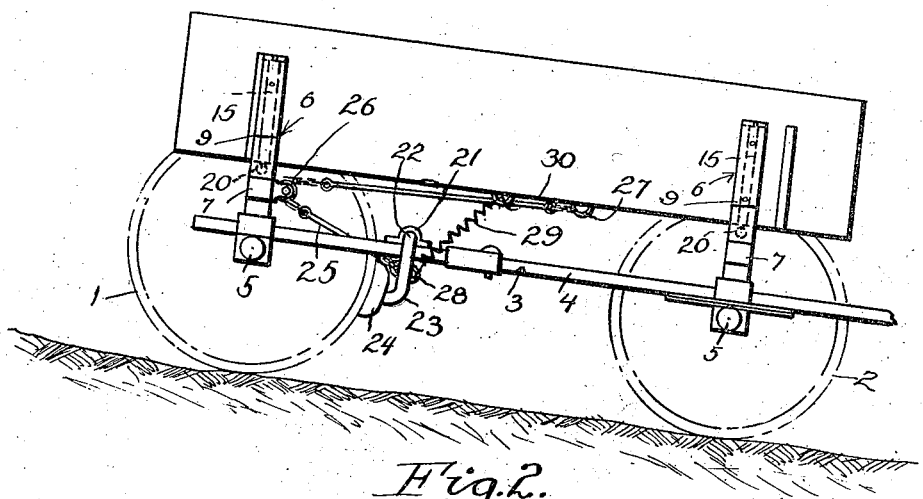
Fig. 2 is a view similar to Fig. 1, showing the brake in operation.
Figure 3:
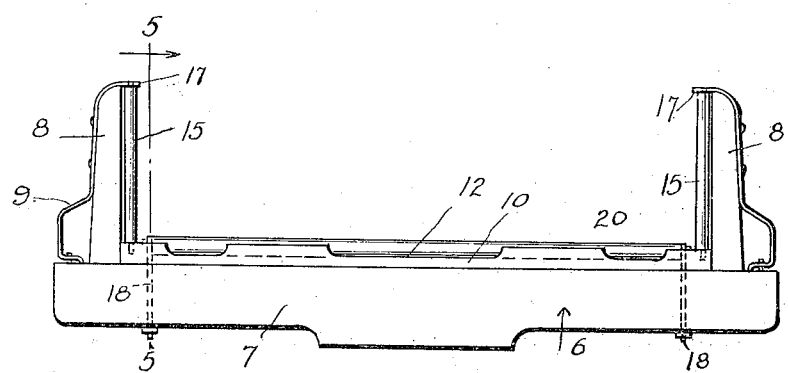
Fig. 3 is an enlarged side view of a bolster.
Figure 4:
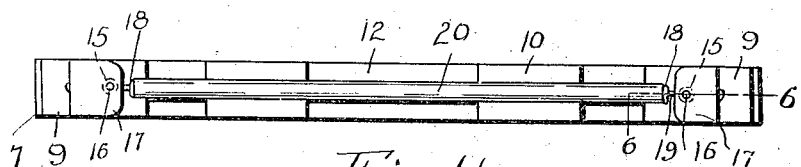
Fig. 4 is a top plan view thereof.
Figure 5:
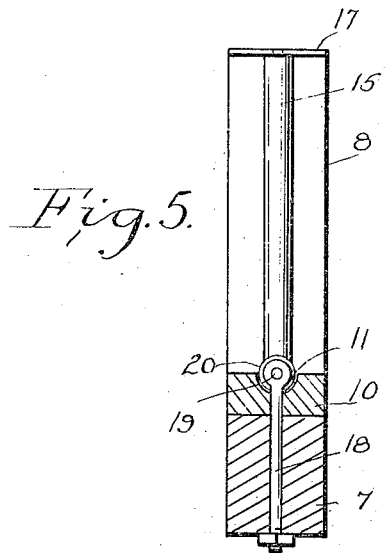
Fig. 5 is an enlarged transverse sectional view taken on line 5—5 of Fig. 3.
Figure 6:
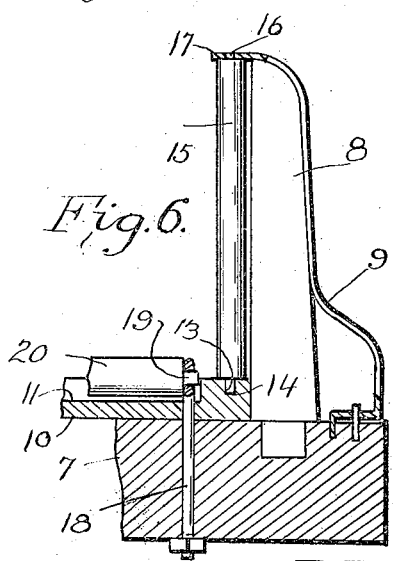
Fig. 6 is an enlarged sectional view taken on the line 6—6 of Fig. 4.

It will be evident from the foregoing that in use when the wagon starts down hill, as illustrated in Fig. 2, the wagon body will shift forward thus causing a pull on the connection which will cause the brakes to be applied. As soon as level ground is again struck and the pressure released from the chain the springs 29 will cause the brake to be released and the wagon may proceed in the ordinary manner. With this mechanism it is evident that a simple and effective automatic brake is provided which will operate without the necessity of any attention from the driver or user and thus safety is assured should the weight of the load control the amount of pressure applied on the brake.

While in the foregoing there has been shown and described the preferred embodiment of this invention it is to be understood that such changes in the combination and arrangement of parts as may fall within the scope of the claim may be restorted to without departing from the spirit and scope of the invention.

Having thus described the invention what is claimed as new, is:—

In a brake mechanism wherein the wagon body is movable relatively to the bolsters, wagon bolsters each comprising a main member, standards at the ends of said member, a plate mounted on the main member and having a groove terminating short of the ends, each end portion having a bearing to receive an upright roller, means securing the upper end of said roller and bracing said standard, a roller mounted in said groove, an eye-bolt supporting each end of the last named roller and also serving to secure the plate to the bolster.

In testimony whereof I affix my signature in presence of two witnesses.

PHILIP DOCTOR HARVEY.

Witnesses:
W. E. BAKER,
E. J. MALONES.

Copies of this patent may be obtained for five cents each, by addressing the "Commissioner of Patents, Washington, D. C."